US008849036B2

(12) United States Patent
Shin et al.

(10) Patent No.: US 8,849,036 B2
(45) Date of Patent: Sep. 30, 2014

(54) MAP GENERATING AND UPDATING METHOD FOR MOBILE ROBOT POSITION RECOGNITION

(75) Inventors: Kyung Chul Shin, Seoul (KR); Seong Ju Park, Incheon (KR); Hee Kong Lee, Seoul (KR); Jae Young Lee, Gyeonggi-do (KR); Hyung O Kim, Gyeonggi-do (KR); James Stonier Daniel, Seoul (KR)

(73) Assignee: Yujin Robot Co., Ltd., Seoul (KR)

( * ) Notice: Subject to any disclaimer, the term of this patent is extended or adjusted under 35 U.S.C. 154(b) by 218 days.

(21) Appl. No.: 13/504,534

(22) PCT Filed: Oct. 30, 2009

(86) PCT No.: PCT/KR2009/006366
§ 371 (c)(1),
(2), (4) Date: Apr. 27, 2012

(87) PCT Pub. No.: WO2011/052826
PCT Pub. Date: May 5, 2011

(65) Prior Publication Data
US 2012/0213443 A1 Aug. 23, 2012

(30) Foreign Application Priority Data
Oct. 30, 2009 (KR) .................... 10-2009-0104566

(51) Int. Cl.
G06K 9/00 (2006.01)
G06T 7/20 (2006.01)
G06T 7/00 (2006.01)
G05D 1/02 (2006.01)

(52) U.S. Cl.
CPC ...... *G05D 1/0274* (2013.01); *G05D 2201/0215* (2013.01); *G06T 7/2033* (2013.01); *G06K 9/00664* (2013.01); *G05D 1/027* (2013.01); *G06T 7/0042* (2013.01); *G06T 7/0048* (2013.01); *G05D 1/0272* (2013.01); *G06T 7/208* (2013.01); *G05D 1/0246* (2013.01); *Y10S 901/01* (2013.01)
USPC ................. 382/190; 382/153; 901/1

(58) Field of Classification Search
USPC .......... 382/153, 190; 700/245, 253, 259, 250, 700/205, 247, 256, 258; 701/24, 26, 25, 23, 701/28, 532, 450, 301, 445, 494, 409; 702/152, 150; 706/15, 45; 340/995.1, 340/998; 348/119; 342/357.31; 901/47, 1
See application file for complete search history.

(56) References Cited

U.S. PATENT DOCUMENTS 5,144,685 A * 9/1992 Nasar et al. ............... 382/153
5,610,815 A * 3/1997 Gudat et al. ............... 701/23

(Continued)

FOREIGN PATENT DOCUMENTS

JP 2005-315746 A 11/2005
JP 2010-238008 A 10/2010

(Continued)

OTHER PUBLICATIONS

Harris, et al., A Combined Corner and Edge Detector, Proceedings of the Fourth Alvey Vision Conference, Manchester, pp. 147-151, 1988.

(Continued)

*Primary Examiner* — Sheela Chawan
(74) *Attorney, Agent, or Firm* — Husch Blackwell LLP

(57) ABSTRACT

The present invention relates to a map generating and updating method for mobile robot position recognition, and more specifically relates to a map generating and updating method for mobile robot position recognition, whereby position recognition error can be minimized by registering landmarks extracted during map generation and landmarks extracted on the basis of the probable error in inferred landmarks, calculating the accuracy of landmarks pre-registered during map generation, and adjusting the level of landmarks of low accuracy or removing landmarks which have been registered erroneously.

17 Claims, 8 Drawing Sheets

(56) References Cited

U.S. PATENT DOCUMENTS

| | | | |
|---|---|---|---|
| 5,961,571 A * | 10/1999 | Gorr et al. | 701/494 |
| 7,590,589 B2 * | 9/2009 | Hoffberg | 705/37 |
| 7,957,837 B2 * | 6/2011 | Ziegler et al. | 700/258 |
| 8,467,902 B2 * | 6/2013 | Myeong et al. | 700/258 |
| 8,467,904 B2 * | 6/2013 | Dariush | 700/262 |
| 8,625,854 B2 * | 1/2014 | Valkenburg et al. | 382/106 |
| 2006/0165276 A1 * | 7/2006 | Hong et al. | 382/153 |
| 2007/0265741 A1 | 11/2007 | Oi et al. | |
| 2009/0024251 A1 | 1/2009 | Myeong et al. | |
| 2010/0235285 A1 * | 9/2010 | Hoffberg | 705/75 |

FOREIGN PATENT DOCUMENTS

| | | |
|---|---|---|
| KR | 10-0669250 B1 | 1/2007 |
| KR | 10-0702663 B1 | 4/2007 |
| KR | 10-0757937 B1 | 9/2007 |
| KR | 10-0785784 B1 | 12/2007 |

OTHER PUBLICATIONS

Se, et al.., Mobile Robot Localization and Mapping with Uncertainty using Scale-Invariant Visual Landmarks, The International Journal of Robotics Research, vol. 21, No. 8, Aug. 2002, pp. 735-758.

* cited by examiner

| -1 | 0 | 1 |
|----|---|---|
| -2 | 0 | 2 |
| -1 | 0 | 1 |

[a]

| -1 | -2 | -1 |
|----|----|----|
| 0  | 0  | 0  |
| 1  | 2  | 1  |

[b]

[a]

| 1 | 2 | 3 |
|---|---|---|
| 4 | 5 | 6 |
| 7 | 8 | 9 |

[b]

MAP GENERATING AND UPDATING METHOD FOR MOBILE ROBOT POSITION RECOGNITION

CROSS REFERENCE TO RELATED APPLICATIONS

This application is a U.S. National Phase Application of International Application PCT Application No. PCT/KR2009/006366 filed on Oct. 30, 2009, which claims the benefit of priority from Korean Patent Application No. 10-2009-0104566 filed on Oct. 30, 2009. The disclosures of International Application PCT Application No. PCT/KR2009/006366 and Korean Patent Application No. 10-2009-0104566 are incorporated herein by reference.

TECHNICAL FIELD

The present invention relates to a method for building and updating a map for mobile robot localization, and more particularly, to a method for building and updating a map for mobile robot localization capable of stochastically inspecting and then registering a landmark extracted at the time of building the map and analyzing accuracy of a pre-registered landmark at the time of updating the map to control or delete a level.

BACKGROUND ART

Recently, as a robot technology is developed, a use of a mobile robot setting its own path and moving along the set path has been increased. An a representative of the mobile robot may include a cleaning robot cleaning the inside of a house or a building, a guide robot guiding location, and the like. In particular, the cleaning robot cleans an indoor floor using a vacuum cleaning unit provided therein while moving including various sensors and heading units. Currently, various types of cleaning robots have been commercialized.

There is a need to build a map for a space in which mobile robots move and allow the mobile robots to recognize their own locations in the space in order for these mobile robots to effectively determine their own locations in the space and move to the determined locations. Allowing the mobile robot to recognize its own location with respect to a surrounding space and build a map is referred to as simultaneous localization and mapping (SLAM).

Among the SLAM mechanisms, an image based SLAM builds a map for the surrounding environment using visual features extracted from an image and estimates a posture of robot. Generally, the mobile robot is headed based on dead reckoning by using a gyroscope and an encoder provided in a driving motor and analyzes an image using a camera mounted at a top thereof and build a map. In this case, when an error occurs due to odometry from the gyroscope and the encoder, an accumulated error is corrected by using image information acquired from the camera.

Several related arts for a method for controlling heading of a mobile robot and a mobile robot using the method have been proposed, but do not solve the following problems.

As descriptors for features extracted from an image, several types have been used. However, there is a problem in that these types do not show robust performance when illumination is greatly changed or an image is greatly changed. Further, adaptive heading control mechanisms that can cope with environments in which an input image cannot be used or a heading control error of the mobile robot occur in controlling the heading of the mobile robot have not yet proposed. Further, even though the features are different from each other, a problem of falsely recognizing the different features as the same feature in feature matching has frequently occurred.

DISCLOSURE

Technical Problem

The present invention has been made in an effort to a method for building a map of a mobile robot capable of registering only a landmark having high reliability in which a comparison error obtained by comparing a landmark detected from an image with a predicted landmark is in a tolerable range when registering the landmark at the time of building a map.

The present invention also has been made in an effort to provide a method for updating a map of a mobile robot capable of detecting a landmark corresponding to a pre-registered landmark at the time of updating the map to perform probability matching thereon, controlling quality of the pre-registered landmark according to the matched degree, and removing a falsely registered landmark.

Technical Solution

An exemplary embodiment of the present invention provides a method for building a map for mobile robot localization, including: detecting and temporarily registering a landmark from a first image acquired at a first location by the mobile robot; extracting the corresponding landmark from a second image acquired at a second location by the mobile robot; estimating the temporarily registered landmark from the second image based on moving information and the temporarily registered landmark information; and mainly registering the temporarily registered landmark if it is determined that a matching error is in a range of a predetermined reference error by calculating the matching error between the temporarily registered landmark and the estimated landmark.

In the mainly registering of the temporarily registered landmark, when the matching error deviates from the range of the predetermined reference error, it may be determined that the first image is not a ceiling image and the temporarily registered landmark is discarded.

The first and second images may include the ceiling image of the heading object region of the mobile robot and the ceiling image may include a plurality of features.

The temporarily registering of the landmark may include: dividing the first image into a plurality of sub-images and detecting features by calculating a magnitude of a brightness change and a phase of a brightness change in the plurality of sub-images; and searching features at which the brightness change and the magnitude of the phase of the brightness change are maximum among the plurality of features detected from each sub-image and setting the features as the temporarily registered landmark.

The magnitude in the brightness change may be obtained by taking a square root of a sum of a horizontal brightness change and a vertical brightness change of each sub-image.

The phase of the brightness change may be obtained by taking an arctangent of a ratio of the vertical brightness change to the horizontal brightness change of each sub-image.

The first and second images may include a plurality of same landmarks.

Another exemplary embodiment of the present invention provides a method for updating a map for mobile robot localization, including: a) extracting and registering a landmark by acquiring a first image at a first location; b) detecting a landmark corresponding to the registered landmark by acquiring a second image at a second location and predicting the registered landmark using location information; c) detecting quality of the registered landmark corresponding to the detected landmark; and d) calculating matching probability between the detected landmark and the predicted landmark using a probability function and differentially updating the registered landmark according to the matching probability and the quality of the registered landmark.

In the step d), when the matching probability is lower than a first reference probability, the detected landmark may be discarded.

In the step c), when the quality of the registered landmark is lower than reference quality, the registered landmark may be deleted by determining that the registered landmark is registered by a false-positive match.

In the step d), when the quality of the registered landmark is higher than the reference quality, the detected landmark may be discarded and the detected landmark may not be reflected to the updating of the registered landmark.

In the step d), when the matching probability is higher than a first reference probability and lower than a second reference probability, if it is determined that the quality of the registered landmark is lower than the reference quality, the detected landmark may be discarded.

In the step d), when the matching probability is higher than a first reference probability and lower than a second reference probability, if it is determined that the quality of the registered landmark is higher than the reference quality, the detected landmark may be accommodated.

In the step d), a quality grade of the registered landmark may be one grade lower than a current grade.

In the step d), when the matching probability is higher than a third reference probability, the detected landmark may be accommodated.

In the step d), the registered landmark may be updated and a location of the mobile robot may be corrected, based on the detected landmark and the predicted landmark.

In the step b), the registered landmark may be updated and a location of the mobile robot may be corrected, based on the detected landmark and the predicted landmark.

The quality of the registered landmark may be determined by at least any one of a detection frequency, a history of a detection error, and detection precision of the landmark.

The location information may include a heading distance, a heading direction, a heading time, a rotating angle, and a rotation frequency of the mobile robot.

The registered landmark may be a landmark registered by the method for builing a map for mobile robot localization.

Advantageous Effects

The exemplary embodiments of the present invention confirms the reliability of the detected landmark before the detected landmark is registered and then registers the detected landmark as the landmark when registering the landmark for building the map, thereby registering only the landmark having high reliability.

Further, the exemplary embodiments of the present invention can control the quality of the pre-registered landmark, improve the reliability thereof, and remove the falsely registered landmark by detecting the landmark corresponding to the pre-registered landmark at the time of updating the map and performing the probability matching thereon.

DESCRIPTION OF DRAWINGS

FIG. 7A is a diagram showing an example of an image patch and FIG. 7B is a diagram showing an example of local orientation information on a sub-region of the image patch.

BEST MODE

Figure 1:
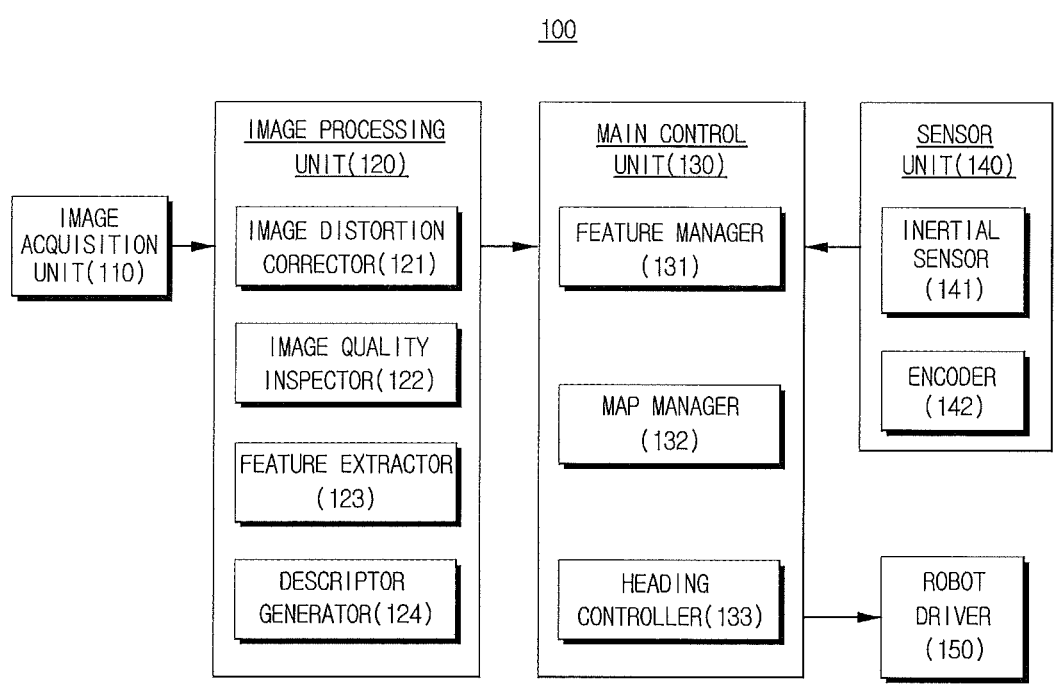
FIG. 1 is a diagram showing a configuration of a mobile robot to which an exemplary embodiment of the present invention is applied.

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings. In describing the present invention, well-known functions or constructions will not be described in detail since they may unnecessarily obscure the understanding of the present invention.

FIG. 1 is a diagram showing a configuration of a mobile robot to which an exemplary embodiment of the present invention is applied.

A mobile robot 100 according to an exemplary embodiment of the present invention may be configured to include an image acquisition unit 110 that acquires an image, an image processing unit 120 that process the image acquired by the image acquisition unit 110, extracts features from the image, and generates descriptors for the features, a sensor unit 140 that senses moving orientation information, a moving distance, and the like, of the mobile robot 100, a main control unit 130 that builds a map for a space in which the mobile robot moves based on the acquired image and controls an operation of the mobile robot based on information about the features extracted from the acquired image and odometry acquired from the sensor unit 150, and a robot driver 140 that drives the robot according to a control of the main control unit 130.

The image acquisition unit 110, which is a device acquiring images about surrounding environment in which the mobile robot is located, may be configured to include image sensors, such as a charge coupled device (CCD), a complementary metal oxide semiconductor (CMOS), and the like. In the exemplary embodiment of the present invention, the image acquisition unit 110 is preferably disposed upwardly to acquire a ceiling image. More preferably, the image acquiring unit 110 may include a wide angle lens such as a fisheye lens, and the like, to acquire a wide range of ceiling image.

The image processing unit 120 may be configured to include an image distortion corrector 121, an image quality inspector 122, a feature extractor 123, and a descriptor generator 124.

The image distortion corrector 121 serves to correct distortion of the image acquired by the image acquisition unit 110. When the image acquisition unit 110 includes the fisheye lens or the wide angle lens, the image acquired by the image acquisition unit 110 includes radial distortion.

Therefore, the image acquisition unit 110 removes the distortion of the image using previously acquired camera parameters.

The image quality inspector 122 serves to determine availability of the acquired image. When direct rays are irradiated to the image acquisition unit 110 or the image acquisition unit 110 is covered with obstacles such as a table, the image acquired by the image acquisition unit 110 may not be appropriate for mobile robot localization.

Therefore, the image quality inspector 122 inspects the acquired image and when the acquired image is inappropriate, serves to exclude the inappropriate image.

As an example, the image quality inspector 122 may process the acquired image as the inappropriate image when brightness of the acquired image is too high or too low based on the brightness of the acquired image. When the acquired image is excluded, the main control unit 130 may control the movement of the mobile robot 100 based on heading record information acquired from a gyroscope 141 or an encoder 142.

In stereo matching that compares between two images, when disparity between the images is represented by d, a focal length is represented by F, a distance from eyes to an image is represented by z, and actually moving distance of the mobile robot is represented by r, a relationship therebetween is represented by the following Equation 1.

$$d = r \cdot F \cdot \frac{1}{Z}$$ [Equation 1]

The image quality inspector 122 detects a change in the brightness of the image acquired by the image acquisition unit 110 as an additional function, thereby detecting that the mobile robot 100 moves downwardly of obstacles such as a table. For example, the image quality inspector detects that the image acquisition unit 110 of the mobile robot 100 is shielded with obstacles by using a brightness average and dispersion of the acquired image.

When the mobile robot 100 enters a bottom of the table, the brightness average of an image frame is gradually reduced and thus, a dispersion value of brightness may be increased or reduced. A method for reducing calculations may determine whether the mobile robot 100 is shielded by obtaining the average and dispersion of the overall image using the brightness average values of each region divided by quartering the image acquired by the image acquisition unit 110 based on a heading direction of the mobile robot 100.

When the image acquisition unit 110 is shielded with obstacles, it is impossible to control the location of the mobile robot 110 based on the image. Therefore, the main control unit 130 controls the movement of the mobile robot 100 based on information about an inertial sensor 44 such as the gyroscope and the encoder 142.

The feature extractor 123 extracts features from the image for the space acquired from the image acquisition unit 110. An example of the features may include a corner of a ceiling, a lamp mounted on a ceiling, or a gate of a space, or the like. However, in order to extract the features using the lamp or the gate, the calculations may be increased and thus, the corner portions of the ceiling may be preferably used as the features. However, in the exemplary embodiment of the present invention, the features extracted from the feature extractor 123 are not limited to the corner, but the above-mentioned several features and various objects present in the space may be used as the features.

A mechanism for extracting a corner as the features will be described below.

An example of the corner extraction mechanism may include Harris corner detection method. Chris Harris and Mike Stephens has proposed a method for extracting a corner from an image in "A Combined Corner and Edge Detector (Proceedings of The Fourth Alvey Vision Conference, Manchester, pp 147-151. 1988)". The method proposed by Harris, or the like is based on the fact that a shift along an edge in the image has a slight difference but a shift in a direction vertical to the edge generates a large difference and a shift in all directions makes a large difference at a corner.

When intensity of an image is represented by I and a change due to shifts x and y in the image is represented by E, E may be represented by the following Equation 2.

$$E_{x,y} = \sum_{u,v} w_{u,v} |I_{x+u,y+v} - I_{u,v}|^2$$ [Equation 2]

In the above Equation 1, w represents an image window.

The Equation 2 may be represented by Equation 3. In Equation 3, a matrix M represents a gradient of image intensity, which is obtained by the following Equation 4.

$$E(x, y) = [x, y] M \begin{bmatrix} x \\ y \end{bmatrix}$$ [Equation 3]

$$M = \begin{bmatrix} \left(\frac{\partial I}{\partial x}\right)^2 & \left(\frac{\partial I}{\partial x}\right)\left(\frac{\partial y}{\partial x}\right) \\ \left(\frac{\partial I}{\partial x}\right)\left(\frac{\partial y}{\partial x}\right) & \left(\frac{\partial I}{\partial y}\right)^2 \end{bmatrix}$$ [Equation 4]

Eigenvalues of the matrix M are obtained. When the eigenvalues each are a predetermined magnitude or more and the relative ratio thereof is a predetermined magnitude or less, it may be determined that the intensity change of the image in all directions is serious. This is defined by a response function of the corner and is represented by the following Equation 4.

$$R = \det M - k(\text{trace } M)^2$$ [Equation 5]

In the above Equation 5, a point in which an R value is larger than 0 and an R value is a local maxima may be determined as a corner.

The descriptor generator 124 serves to generate the descriptors for the features extracted from the feature extractor 123. As the descriptors for the features, scale invariant feature transform (SIFT), speeded up robust features (SURF), or the like, may be used. The SIFT descriptor is a scheme of representing the features using the brightness change distribution of the image, or the like, around the features and the SURF descriptor has been proposed by Herbert Bay, or the like, in 2006. As compared with the SIFT descriptor, the SURF descriptor reduces a dimension of the descriptor to increase a speed and is more robust than a simple gradient by using Haar Wavelet.

The main control unit 130 includes a feature manager 131, a map manager 132, and a heading controller 133.

The feature manager 131 serves to detect features coinciding with the features pre-registered in the feature database by matching the features extracted from the acquired image with the features pre-registered in the feature database while serving to register information about newly acquired features in the feature database (not shown). The feature matching performed by the feature manager 131 may be determined by calculating a Euclidian distance between the descriptors representing the features.

The map manger 132 serves to build and update a map for the space in which the mobile robot 100 is located based on the image acquired by the image acquisition unit 110 of the mobile robot 100, the odometry such as the moving direction and distance of the mobile robot 100, the locations of the features, and the like. In some cases, the map for the space may be provided to the mobile robot 100 in advance. In this case, the map manager 132 may continuously update the map based on the information such as obstacles located in the space and the feature information.

The heading controller 133 serves to control the heading of the mobile robot 100 based on the current location and the odometry of the mobile robot 100. As the exemplary embodiment for heading the mobile robot 100, the mobile robot 100 includes a left wheel (not shown) and a right wheel (not shown) and may include a left wheel driving motor (not shown) and a right wheel driving motor (not shown) as the robot driver 140 for driving the left wheel and the right wheel. The heading controller 133 can perform the heading such as forward, backward, left turn, right turn, and the like, of the mobile robot 100 by controlling the rotation of each of the left wheel driving motor and the right wheel driving motor. In this case, the left wheel driving motor and the right wheel driving motor are each provided with the encoders 142 to acquire the driving information about the left wheel driving motor and the right wheel driving motor.

Meanwhile, the heading controller 133 may be designed to control the heading of the mobile robot 100 by predicting the locations of the following features and the location of the mobile robot based on the locations of the current features and the location of the mobile robot by using an extended Kalman filter (EKF).

In the above-mentioned configuration, the inertial sensor 44 senses inertia to confirm a heading direction of the mobile robot 100 and the sensing information of the inertial sensor 44 and the sensing information of the encoder 142 configure the odometry of the mobile robot 100. When the sensing information of the inertial sensor 44 and the sensing information of the encoder 142 are accurate, the mobile robot 100 may be completely controller by only the odometry acquired from the information. However, the actual location of the mobile robot 100 may differ from the location calculated based on the odometry due to the slip of the driving wheel or the errors of the sensor information in the actual environment. The error may be corrected by using the image acquired by the image acquisition unit 110.

As described above, the descriptor generator 124 of the mobile robot 100 according to the exemplary embodiment of the present invention generates the descriptors for the features of the image.

The local orientation descriptor derives the local orientations from the gradients around the features and is generated based on the relationship between the local orientations.

Hereinafter, a method for building and updating a map for mobile robot localization according to an exemplary embodiment of the present invention will be described in detail with reference to FIGS. 2 to 4.

Figure 2:
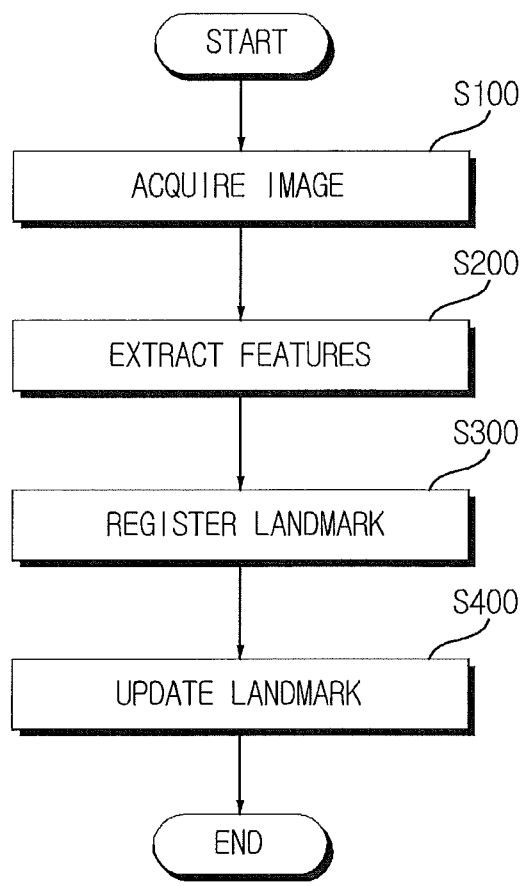
FIG. 2 is a flow chart of a method for building and updating a map for mobile robot localization according to an exemplary embodiment of the present invention.
Figure 3:
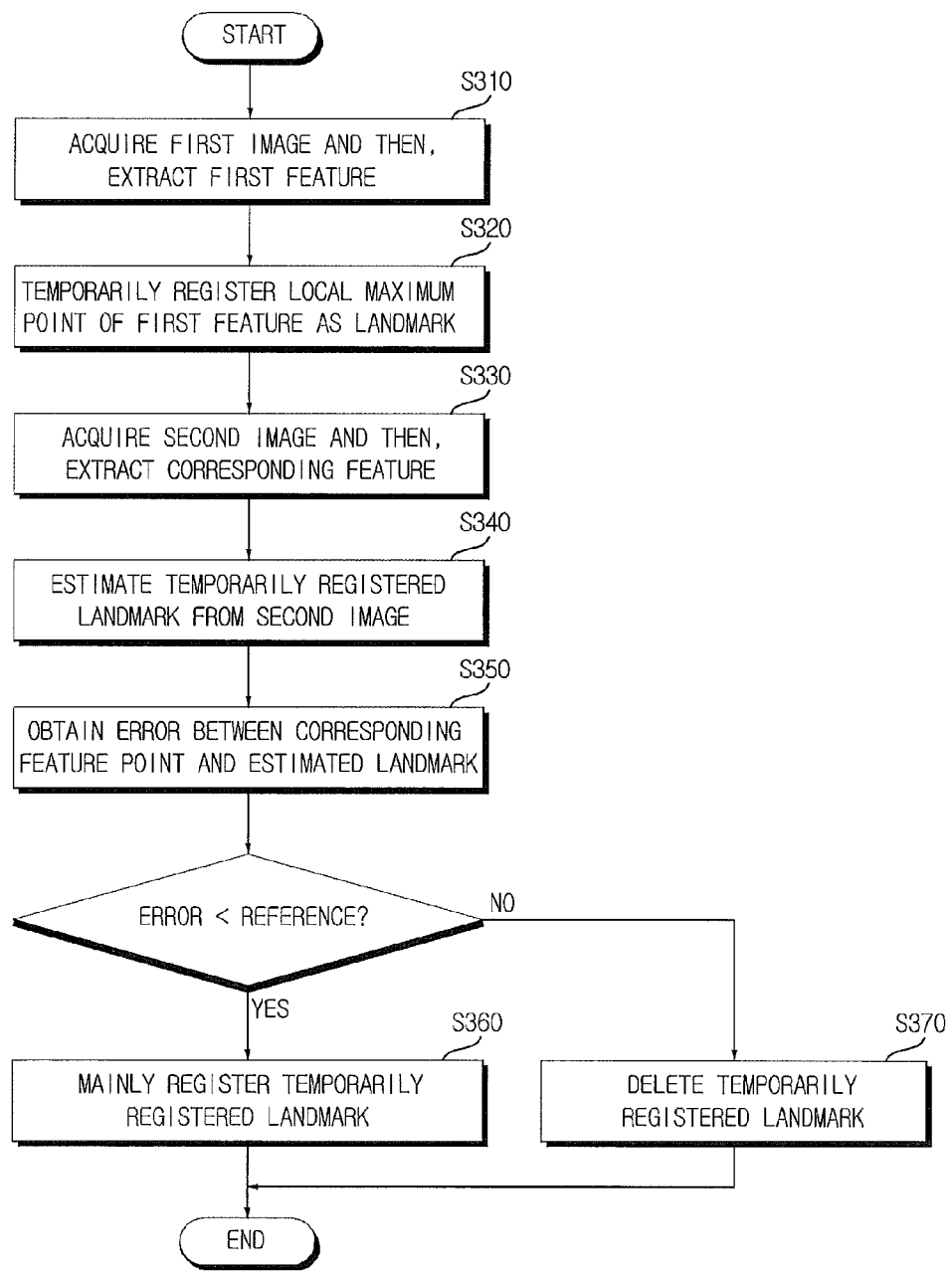
FIG. 3 is a detailed flow chart of the method for building a map for mobile robot localization according to the exemplary embodiment of the present invention.
Figure 4:
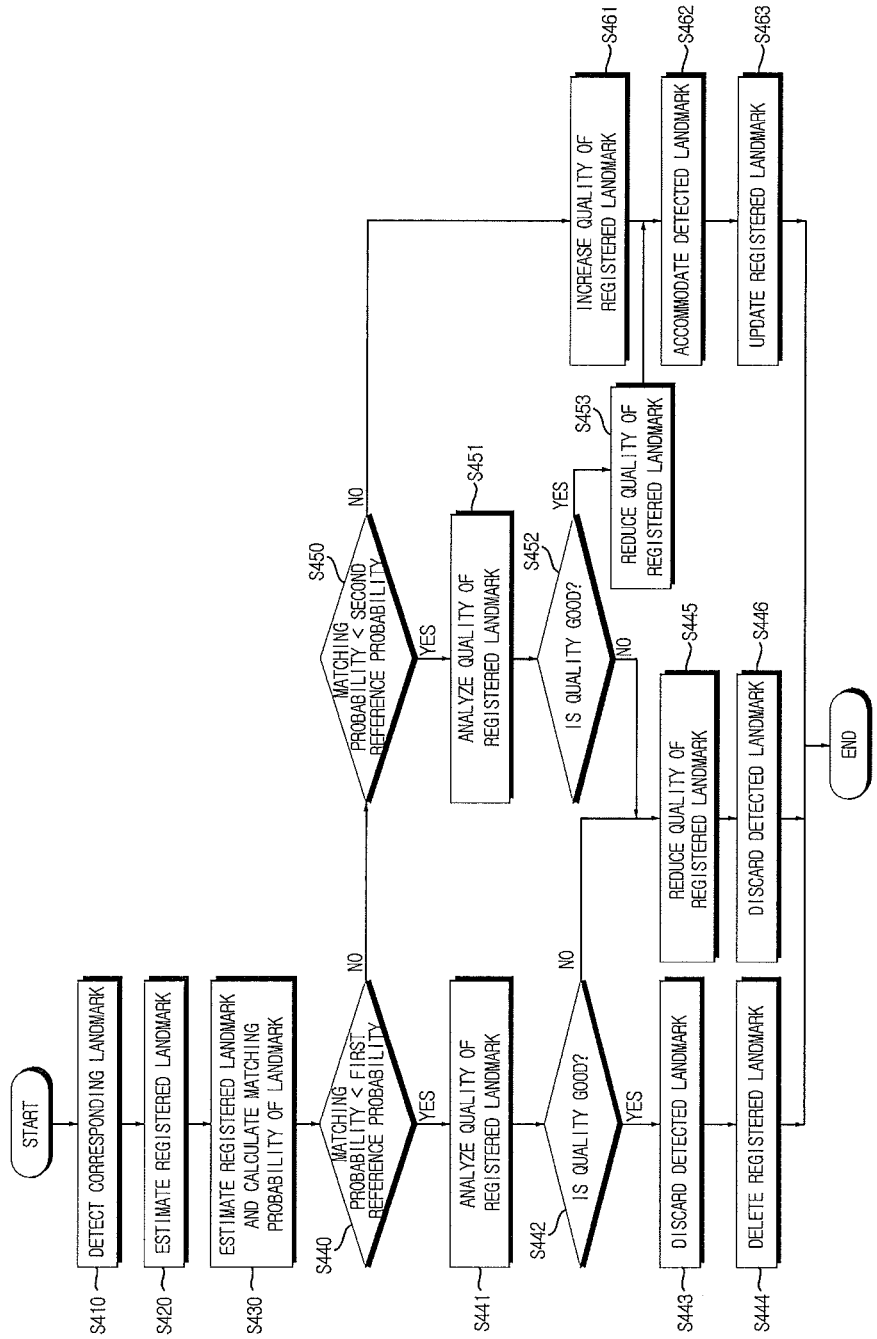
FIG. 4 is a detailed flow chart of the method for updating a map for mobile robot localization according to the exemplary embodiment of the present invention.

FIG. 2 is a flow chart of a method for building and updating a map for mobile robot localization according to an exemplary embodiment of the present invention, FIG. 3 is a detailed flow chart of the method for building a map for mobile robot localization according to the exemplary embodiment of the present invention, and FIG. 4 is a detailed flow chart of the method for updating a map for mobile robot localization according to the exemplary embodiment of the present invention.

Referring to FIGS. 2 to 4, the method for building and updating a map for mobile robot localization according to the exemplary embodiment of the present invention includes: acquiring surrounding images including a ceiling of a region to be headed or cleaned at least two frames by the image acquisition unit 110 (S100); extracting the features from each of the acquired images (S200); building a map by extracting the landmark using the extracted features and registering the extracted landmark by the probability inspection (S300); and updating the map by deleting the landmark registered as the false recognition or changing the reliability of the landmark by stochastically matching the landmark extracted from the image acquired during the heading or cleaning process with the predicted landmark for the registered landmark (S400).

The method for building a map for mobile robot localization according to the exemplary embodiment of the present invention includes: detecting and temporarily registering the landmark from a first image acquired at a first location by the mobile robot 100 (S310 and S320); extracting the corresponding landmark from a second image acquired by moving the mobile robot to a second location (S330); estimating the temporarily registered landmark from the second image based on the moving information and the temporarily registered landmark information (S340); and mainly registering the temporarily registered landmark if it is determined that the matching error is in a range of a predetermined reference error by calculating the matching error between the temporarily registered landmark and the estimated landmark (S360).

In the temporarily registering (S320), the first image is divided into a plurality of sub-images, the features are detected by calculating the magnitude of the brightness change and the phase of the brightness change in the plurality of sub-images, and the features at which the magnitude of the brightness change and the magnitude of the phase of the brightness change are maximum are searched among the plurality of features detected from each sub-image and are thus set as the temporarily registered landmark. A process of extracting the features and extracting the landmark as a local maximum point will be described in detail at the latter half of the present invention.

In the main registering (S360), when the matching error deviates from the range of the predetermined reference error, it is determined that the first image is not the ceiling image and thus, the temporarily registered landmark is discarded (S370).

The first and second images, which are the ceiling image of the heading object region of the mobile robot, preferably include the plurality of features. In addition, the first and second images preferably include the plurality of same landmarks.

In the exemplary embodiment of the present invention, the magnitude of the brightness change is obtained by taking a square root of a sum of the horizontal brightness change and the vertical brightness change of each sub-image and the phase of the brightness change is obtained by taking an arctangent of the ratio of the vertical brightness change to the horizontal brightness change of each sub-image.

A method for updating a map for mobile robot localization according to an exemplary embodiment of the present invention includes: a) extracting the landmark by acquiring the first image at the first image at a first location and registering the landmark, b) detecting the landmark corresponding to the registered landmark by acquiring the second image at the second location (S410) and predicting the registered landmark using the location information (S420), c) detecting the quality of the registered landmark corresponding to the detected landmark, and d) calculating the matching probability of the detected landmark and the predicted landmark by using the probability function (S430) and differentially updating the registered landmark according to the matching probability and the quality of the registered landmark (S440 to S463).

The method for updating a map for mobile robot localization according to the exemplary embodiment of the present invention will be described with reference to FIG. 4.

The mobile robot 100 extracts the landmark by acquiring the first image at the first location and registers the landmark and moves from the first location and then, acquires the second image at the second location.

The mobile robot 100 detects the landmark corresponding to the registered landmark from the second image (S410) and predicts the registered landmark using the moving information (S420). The mobile robot 100 calculates the matching probability between the detected landmark and the predicted landmark using the probability function (S430).

In the exemplary embodiment of the present invention, a Gaussian filter or a EKF probability function that is described in advance or below is applied as the probability function, but other probability functions such as a Kalman filter, a hidden Markov model ("HMM"), and the like, can be applied.

The mobile robot 100 sorts the processing region of the detected landmark into a first region having the lowest matching probability, a second region having an intermediate matching probability, and a third region having a high matching probability according to the results of the matching probability (S440 and S450).

The first region corresponds to a case in which the matching probability is lower than a first reference probability. In this case, the quality of the registered landmark corresponding to the detected landmark compares with the reference quality (S441).

According to the comparison result, the detected landmark is discarded without being used to update the registered landmark when the quality of the registered landmark is lower than the reference quality (S443) and is deleted by determining that the registered landmark is registered by a false-positive match (S444). However, when the quality of the registered landmark is higher than the reference quality, the detected landmark is discarded (S446) and is not reflected to the updating of the registered landmark and the registered landmark is preserved. However, the quality grade of the registered landmark is one grade lower than the current grade (S445).

The second region corresponds to a case in which the matching probability is higher than the first reference probability and lower than a second reference probability (S450). Even in this case, the quality of the registered landmark corresponding to the detected landmark compares with the reference quality (S451).

According to the comparison result, when the quality of the registered landmark is lower than the reference quality, the detected landmark is discarded (S446) and is not reflected to the updating of the registered landmark and the registered landmark is preserved. However, even in this case, the quality grade of the registered landmark is one grade lower than the current grade (S445).

However, when the quality of the registered landmark is higher than the reference quality, the detected landmark is accommodated (S462) and the registered landmark is updated based on the detected landmark (S463). However, even in this case, the quality grade of the registered landmark is one grade lower than the current grade (S453).

The third region corresponds to a case in which the matching probability is higher than a third reference probability and the detected landmark is accommodated. In this case, the registered landmark it corresponds to the detected landmark is an excellent landmark regardless of the quality of the registered landmark, such that the quality grade of the registered landmark is one grade higher than the current grade.

Here, the first reference probability has a lower value than the second reference probability.

The mobile robot 100 updates the registered landmark based on the detected landmark and the predicted landmark and corrects its own location.

The quality of the registered landmark is determined by at least any one of a detection frequency, a history of the detection error, and detection precision of the landmark. The location information includes a heading distance, a heading direction, a heading time, a rotating angle, and a rotation frequency of the mobile robot.

Figure 5:
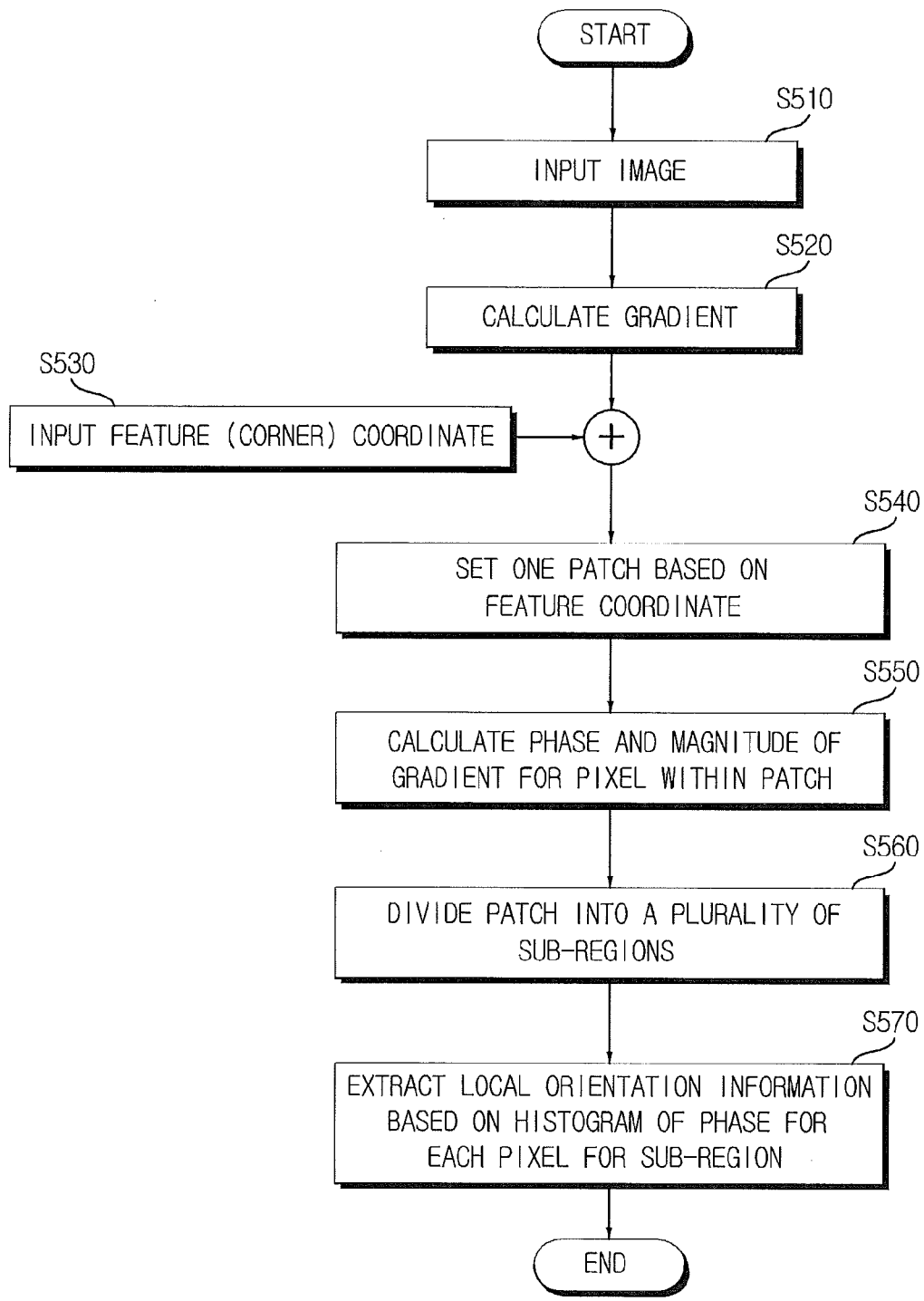
FIG. 5 is a diagram showing a process of generating a local orientation descriptor according to an exemplary embodiment of the present invention.

FIG. 5 is a diagram showing a process of generating the local orientation descriptor in the mobile robot to which the exemplary embodiment of the present invention is applied.

Figures 6, 7:
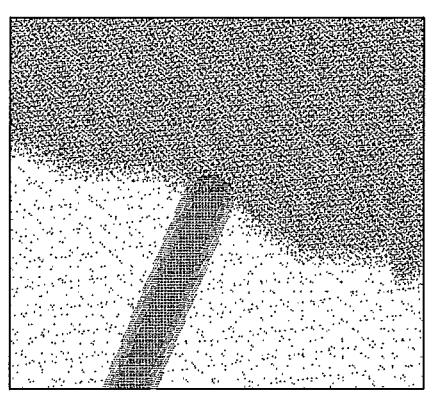
FIG. 6 is a diagram showing a window for calculating a gradient of an image.

The image acquired by the image acquisition unit 110 is received (S510) and the gradients for each pixel of the image is calculated (S520). The gradient calculation may be performed by calculating a horizontal gradient dx and a vertical gradient dy by applying the window as shown in FIG. 6 to each pixel within the image. The horizontal gradient dx may be obtained by a sum of a product of each value of the horizontal window by the intensity value of the pixel and the vertical gradient dy may be obtained by a sum of a product of each value of a vertical window by the intensity value of the pixel.

Coordinates of the features (preferably, corner) extracted from the feature extractor 123 are received (S530) and the image patch based on the features is set (S540). Upon setting the image patch, a 9×9 pixel may be specified as an embodiment. However, in actual practice, the magnitude of the image patch is not limited to the above-mentioned description and may be varied according to the input image and the applied environment.

The phase and magnitude of the gradients in each pixel are calculated by using the gradients for each pixel within the image patch (S550). The phase may be calculated by Equation 5 and the magnitude may be calculated by Equation 6. In Equations 6 and 7, the dx represents the horizontal gradient for the specific pixel and the dy represents the vertical gradient for the specific pixel.

$$\text{phase} = \arctan\left(\frac{dy}{dx}\right) \quad \text{[Equation 6]}$$

$$\text{magnitude} = \sqrt{dx^2 + dy^2} \quad \text{[Equation 7]}$$

Next, the image patch is re-divided into a smaller region to generate a plurality of sub-regions (S560). In the exemplary embodiment of the present invention, in the case of 9×9 image patches, the image patch may be divided into 3×3 sub-regions and thus, may be divided into nine sub-regions.

For each sub region, a histogram for phases for each pixel configuring the sub-regions is prepared and the phase according to a peak value therefor is designated as the local orientation of the corresponding sub-regions (S570).

FIG. 7A shows an example of the image patch and FIG. 7B shows the local orientation information about the sub region of the image patch. In the case of the FIG. 7B, it can be confirmed that a total of nine local orientation information is extracted.

When the nine local orientation information is applied to the heading control of the mobile robot 100, the mobile robot 100 is operated as follows.

The mobile robot 100 estimates its own location based on the odometry of the inertial sensor 44 and the encoder 142 and builds a map in real time. The heading controller 133 uses the EKF to estimate a matching range from the moving direction and the moving distance of the mobile robot 100, thereby performing the feature matching between the images sequentially acquired by the image acquisition unit 110.

The location and heading of the mobile robot 100 are controlled within the range predicted by the EKF of the heading controller 133. In this case, the features are extracted by processing the image acquired by the image acquisition unit 110, the descriptors for the features are generated, and the feature matching is performed using the generated descriptors, thereby estimating the accurate location of the mobile robot 100 to correct the location of the mobile robot 100 according to the odometry.

The method for controlling the heading of the mobile robot 100 according to the above-mentioned description will be described below.

Figure 8:
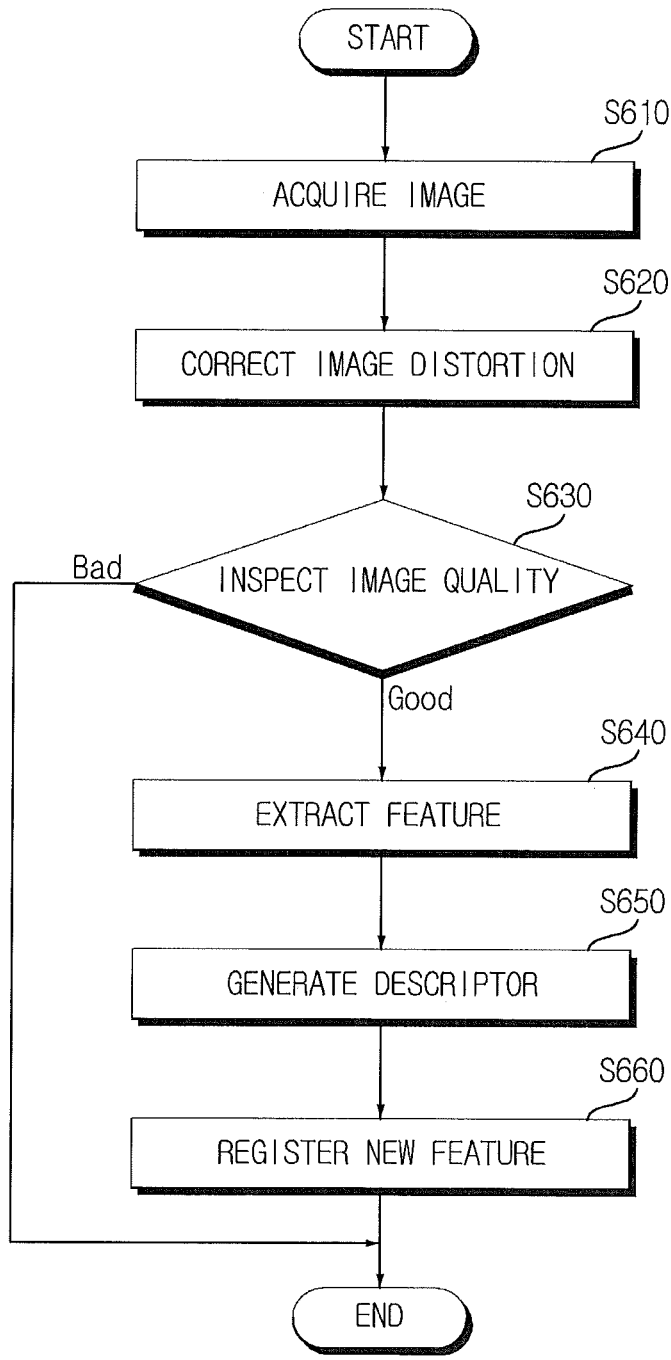
FIG. 8 is a flow chart showing a process of extracting features and generating identifiers according to an exemplary embodiment of the present invention.

FIG. 8 is a flow chart showing a process of extracting features and generating identifiers in the method for controlling the localization and heading of the mobile robot according to an exemplary embodiment of the present invention.

The image acquisition unit 110 acquires the image for the surrounding environments of the mobile robot 100 (S70). The image distortion corrector 121 corrects the distortion of the acquired image (S72). The image quality inspector 122 inspects the image quality (S74) and performs the following process only when the image quality is appropriate for the feature extraction.

The feature extractor 123 extracts the features from the input image (S76), the descriptor generator generates the descriptors for the features (S78), and then, when the generated features are new, the feature manager 131 registers and manages newly generated features (S80).

Meanwhile, when it is determined that the features extracted from the feature extractor 123 correspond to core region features (S82), the descriptors for the core region features are generated (S84) and when the core region features are new, the feature manager 131 registers and manages the core region features (S86).

Figure 9:
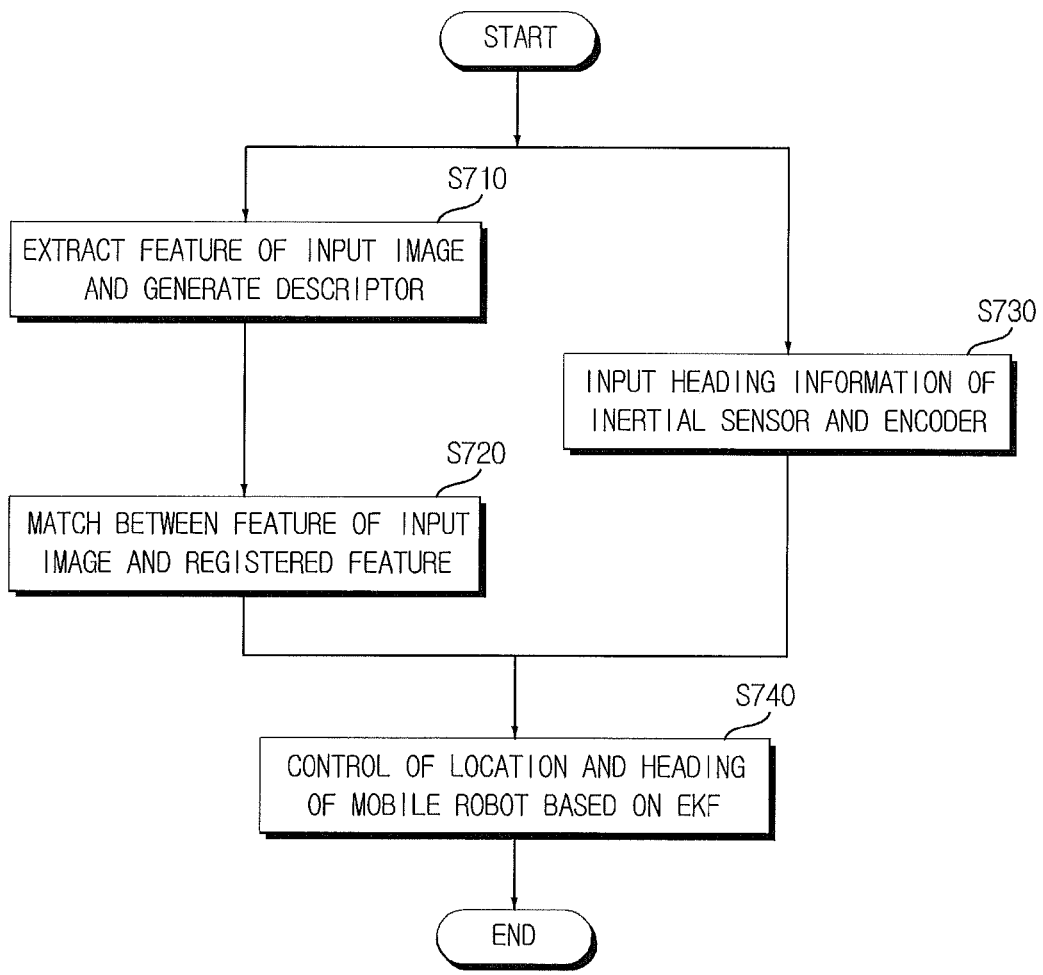
FIG. 9 is a flow chart showing a heading control method according to an exemplary embodiment of the present invention.

FIG. 9 is a flow chart showing the heading control method, in a method for controlling the localization and heading of the mobile robot according to an exemplary embodiment of the present invention.

The features for the input image acquired by the image acquisition unit 110 are extracted and the descriptors therefor are generated (S710). Next, the matching between the features of the input image and the registered features is performed by using the descriptors generated for the input image (S720).

Meanwhile, the main control unit 130 receives the odometry of the mobile robot 100 from the inertial sensor 44 and the encoder 142 (S730).

The heading controller 133 predicts the location of the mobile robot based on the odometry of the mobile robot 100 and corrects the location of the mobile robot based on the input image to control the heading of the mobile robot (S740).

The feature manager 131 matches the features extracted from the image newly acquired by the image acquisition unit 110 with the pre-registered features to determine whether the extracted features coincide with the pre-registered features, such that the false recognition of the features frequently occurs. In order to prevent the false recognition of the features, the exemplary embodiment of the present invention proposes a method for using both of the already described local orientation information and the heading information of the mobile robot 100 using the inertial sensor 44.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

The invention claimed is:

1. A method for building a map for mobile robot localization, comprising:
    detecting and temporarily registering a landmark from a first image acquired at a first location by the mobile robot;
    extracting the corresponding landmark from a second image acquired at a second location by the mobile robot;
    estimating the temporarily registered landmark from the second image based on moving information and the temporarily registered landmark information; and
    mainly registering the temporarily registered landmark if it is determined that a matching error is in a range of a predetermined reference error by calculating the matching error between the temporarily registered landmark and the estimated landmark;
    wherein the temporarily registering of the landmark includes:
        dividing the first image into a plurality of sub-images and detecting features by calculating a magnitude of a brightness change and a phase of a brightness change in the plurality of sub-images; and
        searching features at which the brightness change and the magnitude of the phase of the brightness change are maximal among the plurality of features detected from each sub-image and setting the features as the temporarily registered landmark; and wherein the magnitude in the brightness change is obtained by taking a square root of a sum of a horizontal brightness change and a vertical brightness change of each sub-image.

2. The method of claim 1, wherein in the mainly registering of the temporarily registered landmark, when the matching error deviates from the range of the predetermined reference error, it is determined that the first image is not a ceiling image and the temporarily registered landmark is discarded.

3. The method of claim 2, wherein the first and second images include the ceiling image of the heading object region of the mobile robot and the ceiling image includes a plurality of features.

4. The method of claim 1, wherein the phase of the brightness change is obtained by taking an arctangent of a ratio of the vertical brightness change to the horizontal brightness change of each sub-image.

5. The method of claim 3, wherein the first and second images include a plurality of same landmarks.

6. A method for updating a map for mobile robot localization, comprising:
   a) extracting and registering a landmark by acquiring a first image at a first location;
   b) detecting a landmark corresponding to the registered landmark by acquiring a second image at a second location and predicting the registered landmark using location information;
   c) detecting quality of the registered landmark corresponding to the detected landmark; and
   d) calculating matching probability between the detected landmark and the predicted landmark using a probability function and differentially updating the registered landmark according to the matching probability and the quality of the registered landmark;
   wherein in the step d), when the matching probability is higher than a first reference probability and lower than a second reference probability, if it is determined that the quality of the registered landmark is higher than the reference quality, the detected landmark is accommodated.

7. The method of claim 6, wherein in the step d), when the matching probability is lower than a first reference probability, the detected landmark is discarded.

8. The method of claim 7, wherein in the step c), when the quality of the registered landmark is lower than reference quality, the registered landmark is deleted by determining that the registered landmark is registered by a false-positive match.

9. The method of claim 7, wherein in the step d), when the quality of the registered landmark is higher than the reference quality, the detected landmark is discarded and the detected landmark is not reflected to the registered landmark.

10. The method of claim 6, wherein in the step d), when the matching probability is higher than a first reference probability and lower than a second reference probability, if it is determined that the quality of the registered landmark is lower than the reference quality, the detected landmark is discarded.

11. The method of claim 6, wherein in the step d), a quality grade of the registered landmark is one grade lower than a current grade.

12. The method of claim 6, wherein in the step d), when the matching probability is higher than a third reference probability, the detected landmark is accommodated.

13. The method of claim 12, wherein in the step d), a quality grade of the registered landmark is one grade higher than a current grade.

14. The method of claim 12, wherein in the step d), the registered landmark is updated and a location of the mobile robot is corrected, based on the detected landmark and the predicted landmark.

15. The method of claim 6, wherein the quality of the registered landmark is determined by at least any one of a detection frequency, a history of a detection error, and detection precision of the landmark.

16. The method of claim 6, wherein the location information includes a heading distance, a heading direction, a heading time, a rotating angle, and a rotation frequency of the mobile robot.

17. The method of claim 6, wherein the registered landmark is a landmark registered by the method for building a map of claim 1.

* * * * *